US010563100B2

(12) United States Patent
Shalbafan et al.

(10) Patent No.: US 10,563,100 B2
(45) Date of Patent: Feb. 18, 2020

(54) CHITOSAN-BASED FORMALDEHYDE SCAVENGER AND APPLICATIONS THEREOF IN WOOD-BASED PRODUCTS

(71) Applicants: Ali Shalbafan, Ghom (IR); Hedi Hassannejad, Sardasht (IR); Mehdi Rahmaninia, Noor (IR)

(72) Inventors: Ali Shalbafan, Ghom (IR); Hedi Hassannejad, Sardasht (IR); Mehdi Rahmaninia, Noor (IR)

( * ) Notice: Subject to any disclaimer, the term of this patent is extended or adjusted under 35 U.S.C. 154(b) by 34 days.

(21) Appl. No.: 15/921,640

(22) Filed: Mar. 14, 2018

(65) Prior Publication Data

US 2018/0201812 A1 Jul. 19, 2018

Related U.S. Application Data

(60) Provisional application No. 62/538,710, filed on Jul. 30, 2017.

(51) Int. Cl.
| | |
|---|---|
| C09J 161/24 | (2006.01) |
| B27N 3/08 | (2006.01) |
| B27N 1/02 | (2006.01) |
| B27N 3/00 | (2006.01) |
| B27N 1/00 | (2006.01) |
| C09J 11/08 | (2006.01) |
| C09J 5/06 | (2006.01) |

(52) U.S. Cl.
CPC ............... *C09J 11/08* (2013.01); *B27N 1/003* (2013.01); *B27N 1/0209* (2013.01); *B27N 3/002* (2013.01); *B27N 3/08* (2013.01); *C09J 5/06* (2013.01); *C09J 161/24* (2013.01)

(58) Field of Classification Search
None
See application file for complete search history.

(56) References Cited

U.S. PATENT DOCUMENTS

| | | | |
|---|---|---|---|
| 4,346,181 A * | 8/1982 | Allan | C08L 61/00 521/136 |
| 8,043,383 B2 | 10/2011 | Tutin et al. | |
| 9,234,100 B2 | 1/2016 | Verville et al. | |
| 2012/0329906 A1 | 12/2012 | Dicke et al. | |
| 2019/0233690 A1* | 8/2019 | Wang | C08L 5/08 |

OTHER PUBLICATIONS

Jacek Dutkiewicz, Preparation of cured urea—formaldehyde resins of low formaldehyde emission, Journal of applied polymer science, 1984, vol. 29, Issue 1, pp. 45-55.

* cited by examiner

*Primary Examiner* — Mary Lynn F Theisen

(57) ABSTRACT

An adhesive composition is disclosed, and includes an aldehyde-based resin selected from the group consisting of urea-formaldehyde resins, melamine-formaldehyde resins, melamine-urea-formaldehyde resins, phenol-containing resins, and mixtures, combinations, and sub-combinations thereof, and a formaldehyde scavenger selected from the group consisting of chitosan, nano-chitosan, functionalized chitosan, and mixtures, combinations, and sub-combinations thereof.

14 Claims, 9 Drawing Sheets

CHITOSAN-BASED FORMALDEHYDE SCAVENGER AND APPLICATIONS THEREOF IN WOOD-BASED PRODUCTS

CROSS-REFERENCE TO RELATED APPLICATION

This application claims the benefit of priority from U.S. Provisional Patent Application Ser. No. 62/538,710, filed on Jul. 30, 2017, and entitled "WOOD-BASED PANELS USING CHITOSAN AND MODIFIED CHITOSAN AS FORMALDEHYDE SCAVENGERS," which is incorporated herein by reference in its entirety.

TECHNICAL FIELD

The present disclosure relates to methods for reducing formaldehyde emissions from wood-based panels and particularly to reducing formaldehyde emissions from wood-based panels utilizing formaldehyade scavengers.

BACKGROUND

Aldehyde-based resins such as urea formaldehyde (UF), melamine formaldehyde (MF), melamine-urea formaldehyde (MUF), and phenol formaldehyde (PF) resins are used as adhesives in the wood-based panel (WBP) production industries. However, using aldehyde-based resins as adhesives may be associated with some disadvantages such as formaldehyde emission during and after production of WBPs. Two factors may contribute to the formaldehyde emission from WBPs, free formaldehyde which exists in the adhesive, and hydrolysis of the cured aldehyde-based resins. Formaldehyde is reported to be a probable human carcinogen by different agencies such as international agency for research on cancer (2006), European chemicals agency for risk assessment (2010) and environmental protection agency (2012). As a result, there is an ongoing struggle in the WBP production industries to reduce the amount of formaldehyde emission from the WBPs.

Various methods have been used for reducing the amount of formaldehyde emission from WBPs. Examples include but are not limited to optimization of formaldehyde to urea molar ratio in the adhesive compositions, modification of urea formaldehyde resin with melamine, phenol, etc., application of alternative resins (e.g. natural resin and non-formaldehyde synthetic resins), replacement of formaldehyde by alternative aldehydes (e.g. isobutyraldehyde, succinaldehyde, glyoxal-aldehyde etc.), optimization of the WBP production process, panel preparation and post-production treatments, and application of formaldehyde scavengers. These methods are associated with problems, though, such as lower water resistance of the produced WBPs in case of using natural resins as adhesive or higher cost of alternative adhesive compositions.

Application of formaldehyde scavengers seems to be a promising method for reducing the amount of formaldehyde emission from WBPs. Urea and ammonium derivatives are the most typical formaldehyde scavengers that may be used in the adhesive compositions. However, application of urea and ammonium derivatives may affect the physical and mechanical properties of the WBPs. There is an ongoing need in the art for an eco-friendly, bio-based and biodegradable composition that may be used as a formaldehyde scavenger. Also, there is a need in the art for a formaldehyde scavenger capable of reducing the amount of formaldehyde emission from the WBPs while not significantly affecting the physical and mechanical properties of the WBPs, such as modulus of elasticity, bending strength, internal bonding, thickness swelling, and water absorption.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure is directed to an adhesive composition that may include an aldehyde-based resin selected from the group consisting of urea-formaldehyde resins, melamine-formaldehyde resins, melamine-urea-formaldehyde resins, phenol-containing resins, and combinations thereof, and a formaldehyde scavenger selected from the group consisting of chitosan, nano-chitosan, functionalized chitosan, and combinations thereof.

The above general aspect may include one or more of the following features. The adhesive composition may further include a hardener. For example, the hardener may be selected from the group consisting of ammonium salts such as ammonium chloride, ammonium sulfate, ammonium persulfate, carbonate-based components such as propylene carbonate, potassium carbonate, sodium carbonate, sodium hydrogen carbonate, potassium hydrogen carbonate, ammonium chloride, magnesium chloride, ammonium sulfate, ammonium persulfate, magnesium chloride, and combinations thereof.

According to some implementations, the hardener may be used in a range between 0.01 wt. % and 10 wt. % based on solid content of the adhesive composition. According to some implementations, the adhesive composition may have a pH between 4 and 13. According to some implementations, the formaldehyde scavenger may be used in a range between 0.01 wt. % and 15 wt. % based on solid content of the adhesive composition.

According to one implementation, the formaldehyde scavenger may include chitosan in a range between 0.01 wt. % and 15 wt. % based on solid content of the adhesive composition. According to another implementation, the formaldehyde scavenger may include nano-chitosan with an average particle size of 10 nm to 110 nm and an amount between 0.01 wt. % and 5 wt. % based on solid content of the adhesive composition.

According to some implementations, the formaldehyde scavenger may include functionalized chitosan with an amount ranging between 0.01 wt. % and 5 wt. % based on solid content of the adhesive composition, where the functionalized chitosan may be functionalized by formaldehyde absorbents groups like amino silane derivatives, manganese oxide, melamine and phenol-based components, and graphite/carbon-based components.

According to some implementations, the formaldehyde scavenger may include functionalized chitosan with an amount between 0.01 wt. % and 5.0 wt. % based on solid content of the total adhesive composition, where the functionalized chitosan may be functionalized by hydroxyl and amine groups.

According to another general aspect, the present disclosure is directed to a method for reducing formaldehyde emissions from wood-based panels (WBPs). The method may include forming an adhesive composition by mixing an aldehyde-based resin and a formaldehyde scavenger selected from the group consisting of chitosan, nano-chitosan, functionalized chitosan, and combinations thereof; forming a wooden layer by blending the adhesive composition with wooden materials; and hot pressing the wooden layer at a press temperature between 75° C. and 230° C. to obtain WBPs.

According to one implementation, forming an adhesive composition by mixing an aldehyde-based resin and a formaldehyde scavenger may include forming the adhesive composition by mixing the aldehyde-based resin and the formaldehyde scavenger in a form of a chitosan powder selected from the group consisting of chitosan powder, chitosan nanopowder, functionalized chitosan powder, and combinations thereof.

According to some implementations, blending the adhesive composition with wooden materials may include blending the adhesive composition with wooden materials in an amount between 50 g and 400 g per 1 $m^2$ of the wooden materials. In other words, blending the adhesive composition with wooden materials may include blending the adhesive composition with wooden materials in an amount between 3 wt. % and 49 wt. % based on solid content of the wooden materials.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples to provide a thorough understanding of the relevant teachings related to the exemplary embodiments. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be plain to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

As discussed above, there is a need for a more effective method for reducing formaldehyde emissions from WBPs. The present disclosure discloses an adhesive composition including a formaldehyde scavenger that may be used for producing WBPs with lower formaldehyde emissions. The formaldehyde scavenger may be a chitosan-containing composition that may be added to the adhesive composition in different forms, including but not limited to acidic solutions of chitosan, chitosan powder, chitosan nanopowder, functionalized chitosan, and mixtures thereof. The present disclosure further discloses a method for reducing formaldehyde emissions from WBPs by adding the formaldehyde scavenger to the adhesive composition used for producing the WBPs.

Figure 1:
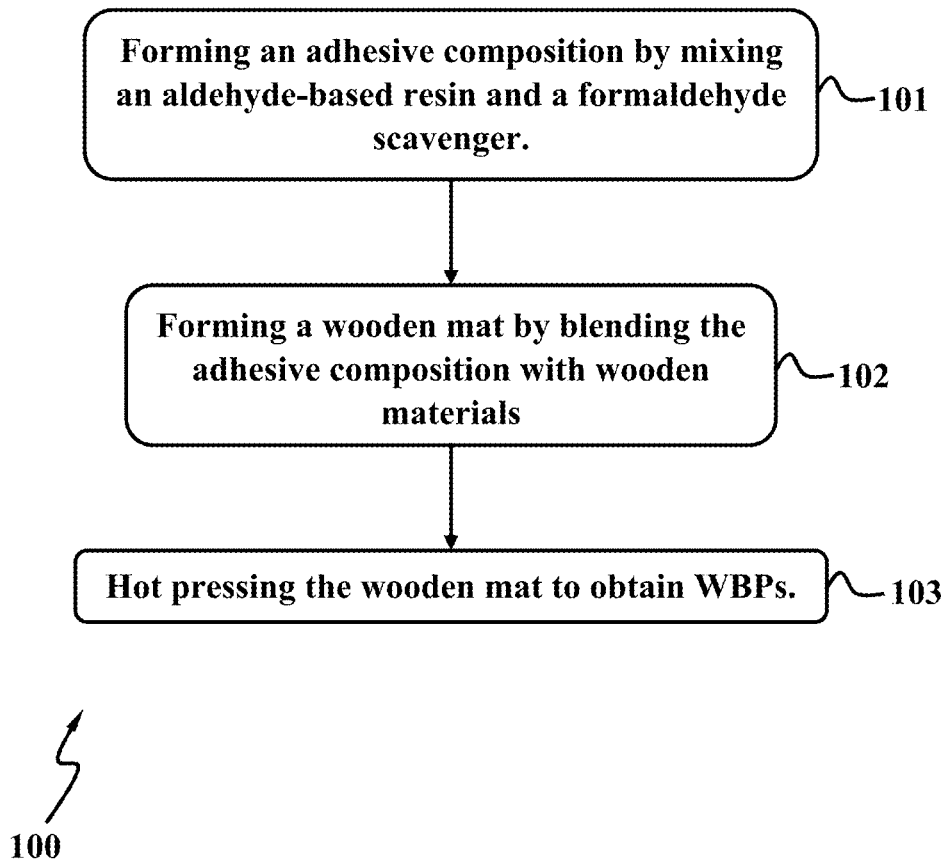
FIG. 1 is an implementation of a method for reducing formaldehyde emissions from wood-based panels (WBPs).

Referring first to FIG. 1, example operations in a process in one implementation of a method for reducing formaldehyde emissions from WBPs according to aspects of this disclosure will be described in reference to the illustrated flow diagram 100. An instance of a process according to the flow diagram 100 can include forming at 101 an adhesive composition, and example operations at 101 can include, in one implementation, mixing an aldehyde-based resin and a formaldehyde scavenger. In an example implementation of a process according to the flow diagram 100, the process can include forming at 102 a wooden layer, by operations that can include, for example, blending the adhesive composition formed in 101 with wooden materials. A process according to the flow diagram 100 can then proceed to a hot pressing at 103 of the wooden layer formed at 102 to obtain WBPs. Examples of the hot pressing at 103 and other operations applied in the process described in reference to diagram 100 will be described in greater detail below.

Referring to FIG. 1, in an implementation, operations applied at 101 can include mixing an aldehyde-based resin and a formaldehyde scavenger, for example, mixing an aldehyde-based resin and a formaldehyde scavenger selected from the group consisting of chitosan, nano-chitosan, functionalized chitosan, and mixtures thereof. In an implementation, the aldehyde resin may be selected from the group consisting of urea-formaldehyde resins, melamine-formaldehyde resins, melamine-urea-formaldehyde resins, phenol-containing resins, and mixtures, combinations and sub-combinations thereof. In an aspect, the formaldehyde scavenger may be included in an amount between, for example, 0.01 wt. % and 15.0 wt. % based on solid content of the adhesive composition. Operations applied at 101, in mixing an aldehyde-based resin and a formaldehyde scavenger, may include, for example, mixing urea-formaldehyde resin as the aldehyde-based resin and a chitosan-containing composition as the formaldehyde scavenger. The chitosan-containing composition can be, for example, one or more members selected from the group consisting of, chitosan, nano-chitosan, functionalized chitosan, and mixtures, combinations, and sub-combinations thereof.

Referring to FIG. 1, according to one implementation, operations applied at 101 may include mixing a hardener with the mixture of the aldehyde-based resin and the formaldehyde scavenger. The hardener may be one or more members selected from the group consisting of ammonium salts such as ammonium chloride, ammonium sulfate, ammonium persulfate, carbonate-based components such as propylene carbonate, potassium carbonate, sodium carbonate, sodium hydrogen carbonate, potassium hydrogen carbonate, and mixtures, combinations, and sub-combinations thereof.

According to an implementation, the hardener mixed at 101 may be added in a range, for example, between 0.01 wt. % and 6.0 wt. % based on solid content of the adhesive composition. In an example, in forming at 101 an adhesive composition, mixing an aldehyde-based resin, a formaldehyde scavenger, and a hardener may include mixing urea-formaldehyde resin as the aldehyde-based resin, a chitosan-containing composition as the formaldehyde scavenger, and ammonium sulfate as the hardener.

According to some implementations, operations applied at 101 may involve mixing the aldheyde-based resin with the chitosan-containing composition in different forms, such as, for example, a solution form or a powder form. Operations applied at 101 can include, for example, mixing an acidic solution of chitosan with the aldehyde-containing resin. In such operations, the acidic solution of chitosan may include a chitosan in acetic acid solution with a concentration, for example, between 0.01 wt. % and 3.0 wt. %. In another example, chitosan powder may be mixed with the aldehyde-containing resin.

With further reference to FIG. 1, in operations applied at 101, the chitosan-containing composition may include nano-chitosan (also referred to as chitosan nanopowder). Chitosan nanopowder may first be synthesized by, for example, a physiochemical method and can then be mixed with the aldehyde-based resin. In an aspect, the chitosan nanopowder may have an average particle size, for example, between 10 nm and 110 nm.

With further reference to FIG. 1, in operations applied at 101, the chitosan-containing composition may include functionalized chitosan. For example, chitosan may be functionalized by formaldehyde absorbents groups such as amino silane derivatives, manganese oxide, melamine and phenol-based components, and graphite/carbon-based components. According to some implementations, chitosan may be functionalized with alcohol functional groups, amide functional groups, and amine functional groups. The functionalized chitosan may function as an effective formaldehyde scavenger due to its hydroxyl and amine functional groups. Further functionalization of chitosan with amino silane derivatives can improve the quantity of the functional groups in the chitosan structure, which may lead to better formaldehyde scavenging function. According to an implementation, chitosan may be functionalized with 3-[2-(2-aminoethylamino)ethylamino]propyl-trimethoxysilane] (AAAPTMS).

According to one or more implementations, the adhesive composition formed by operations applied at 101, such as the examples described above, can include an aldehyde-based resin, a chitosan-containing composition as the formaldehyde scavenger, and optionally a hardener. The chitosan containing composition may have an amount ranging, for example, between 0.01 wt. % and 15.0 wt. % based on solid content of the adhesive composition and the hardener may have an amount ranging, for example, between 0.01 wt. % and 6.0 wt. % based on solid content of the adhesive composition.

Referring to FIG. 1, in an implementation, a process according to the flow diagram 100 can include forming, at 102 a wooden layer. Example operations applied at 102 can include blending the adhesive composition formed at 101 with wooden materials, and such operations can include, for example, spraying the adhesive composition over wooden materials, such as particles, fibers, or strands in a blender, and then thoroughly mixing, in the blender, the adhesive composition with the wooden materials. Operations applied at 102 can also include, in an implementation, forming the above-described blended mixture of the wooden materials and the adhesive composition into a wooden mat. In an example of the above-described blending operations, the adhesive composition can have an amount, for example, between 3.0 wt. % and 49.0 wt. % based on dry weight of the total wooden layer composition.

Referring to FIG. 1, in an implementation, operations applied at 102 in blending the adhesive composition with wooden materials can include spreading the adhesive composition over the wooden materials by, for example, a waterfalling method and then forming the resulting mixture of wooden materials and the adhesive composition into a wooden mat. According to one implementation, blending the adhesive composition with wooden materials can include blending the adhesive composition in a range, for example, between 50 g and 400 g of the adhesive composition per 1 $m^2$ of the wooden layer. According to another implementation, blending the adhesive composition with wooden materials can include blending the adhesive composition in an amount, for example, between 3 wt. % and 49 wt. % based on solid content of the wooden materials.

Referring to FIG. 1, in an implementation, an instance of a process according to the flow diagram 100 can include a hot pressing, at 103 of the above-described wooden layer formed, to obtain a WBP sample. Example operations in the hot pressing at 103 can include placing the wooden layer under a hot press with a temperature, for example, between 75° C. and 230° C. In an implementation, operations in the hot pressing at 103 of the wooden layer may include hot pressing the wooden layer at a specific pressure, for example, between 0.2 $N/mm^2$ and 8 $N/mm^2$. In an aspect, hot pressing at 103 at this example specific pressure can be applied using the above-described example temperature of between 75° C. and 230° C.

WBP panels produced by the disclosed adhesive composition, which includes chitosan-containing compositions as the formaldehyde scavenger may have a considerably lower formaldehyde emission. Benefits of using the disclosed adhesive composition in producing WBPs can include but are not limited to reducing the amount of formaldehyde emission from the WBPs and not significantly influencing the physical and mechanical properties of the WBPs, such as modulus of elasticity, bending strength, internal bonding, thickness swelling, and water absorption, as will be discussed in greater detail in connection with the following examples.

EXAMPLE 1

In this example, chitosan nanopowder is synthesized by a physiochemical method, where anhydrous citric acid is used as a crosslinking agent. To this end, a chitosan solution was formed by dissolving chitosan into an acetic acid solution. 0.7 gram of chitosan was added to 30 cm³ of the acetic acid solution and then the mixture was stirred at 70° C. for 3 hours. The acetic acid solution had a concentration of about 1 wt. %. A citric acid solution with a concentration of 2.33 w/w was then added to the chitosan solution in a dropwise manner. Then, 0.2 mmol of potassium sulfate was mixed with the obtained solution as an initiator. To control the pH at a level of 4, sodium hydroxide was gradually added to the solution. After refluxing the mixture at 70° C. for 2 hours under $N_2$ atmosphere, the obtained transparent mixture was held in an ice bath for 1 hour. Chitosan nanoparticles were then separated from the mixture by centrifuging the mixture at 9000-15000 rpm for 40 minutes. The separated chitosan nanoparticles were then freeze-dried for 48 hours to obtain chitosan nanopowder.

Figure 2:
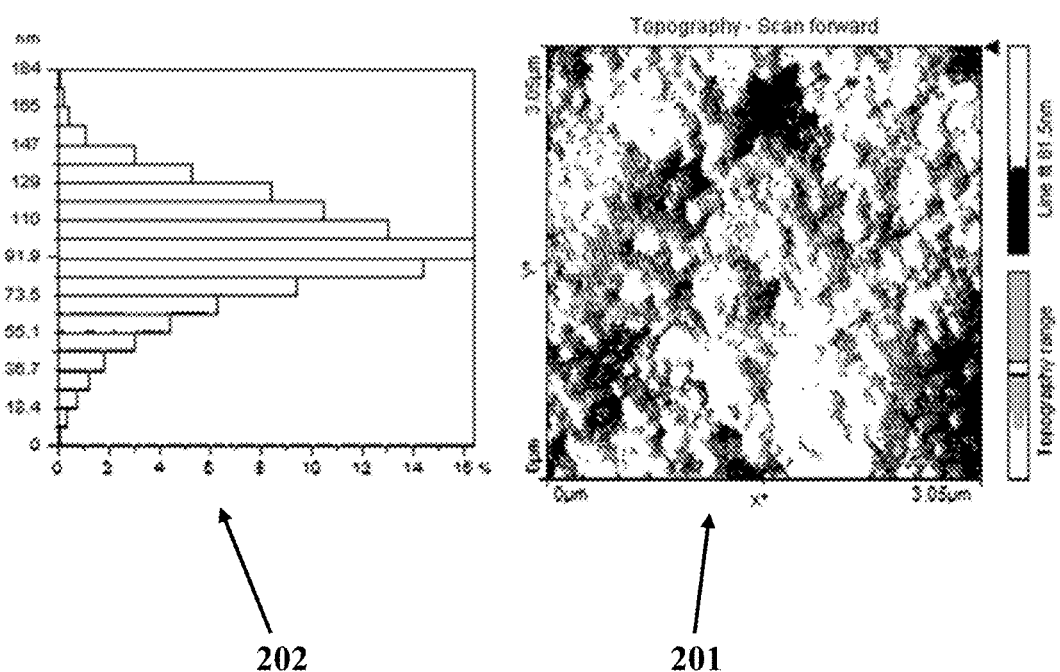
FIG. 2 is an atomic force microscope (AFM) image of the synthesized chitosan nanopowder and a corresponding size distribution analysis, according to one implementation of the present disclosure.

FIG. 2 is an atomic force microscope (AFM) image 201 of the synthesized chitosan nanopowder and a corresponding size distribution analysis 202. Referring to FIG. 2, the average particle size of the synthesized chitosan nanopowder is between 10 nm and 110 nm.

EXAMPLE 2

In this example, chitosan is functionalized with 3-[2-(2-aminoethylamino)ethylaminolpropyl-trimethoxysilane] (AAAPTMS). To this end, a first solution was prepared by dispersing 0.4 g of chitosan into 40 ml of toluene under ultrasonic waves. A second solution was prepared by mixing 0.4 g of AAAPTMS with the first solution. The second solution was then refluxed at 110° C. for 24 hours, and further stirred with a stirrer speed of 350 rpm. Functionalized chitosan was separated from the second solution by centrifuging the second solution at 4000 rpm for 30 minutes. The separated functionalized chitosan was then washed three times with an ethanol solution and dried in an oven at 70° C. for 12 hours to obtain functionalized chitosan powder.

Figure 3:
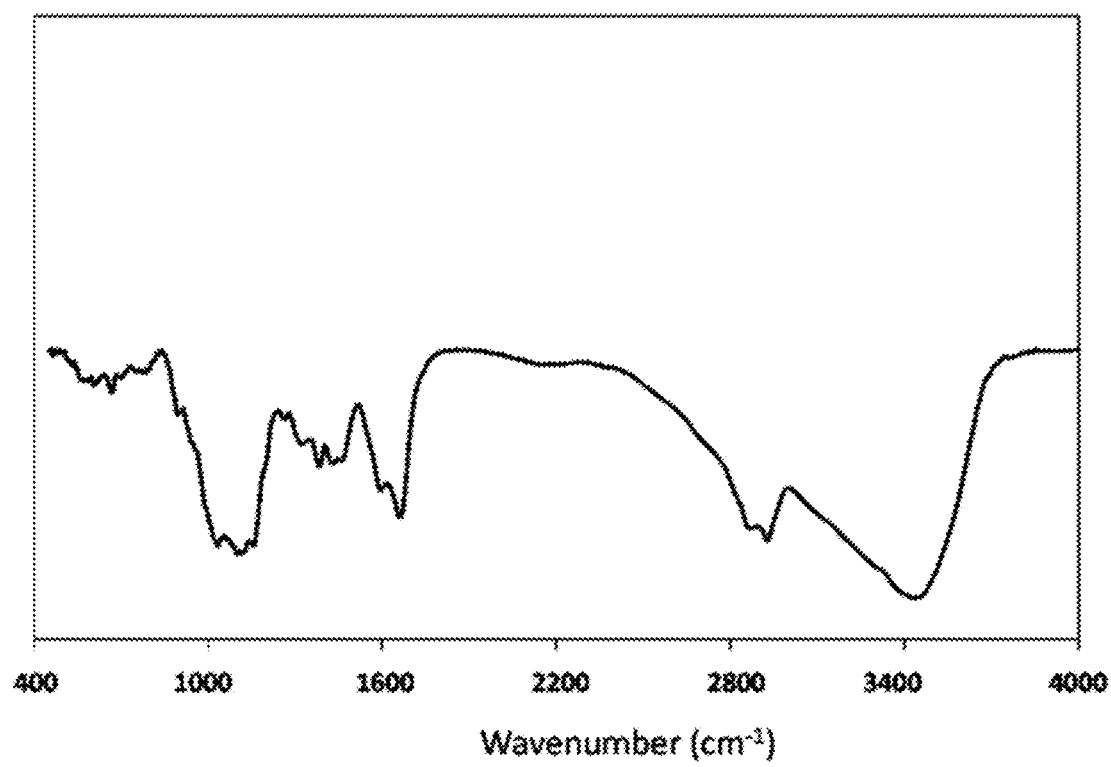
FIG. 3 shows an infrared spectrum of the synthesized functionalized chitosan powder, according to one or more implementations of the present disclosure.

FIG. 3 shows an infrared spectrum of the synthesized functionalized chitosan powder. Referring to FIG. 3, the absorption peak at 3450 $cm^{-1}$ is representative of overlapping tensile vibrations of hydroxyl groups (OH) and also tensile vibrations of free amine groups (N—H). The absorption peak observed in 2980-2900 $cm^{-1}$ region relates to C—H bond in chitosan structure. The absorption peak at 1657 $cm^{-1}$ likely indicates the presence of an amide group. The absorption peak at 1594 $cm^{-1}$ relates to flexural vibrations of $NH_2$, the absorption peak at 1424 $cm^{-1}$ relates to flexural vibrations of methyl groups, the absorption peak at 1380 $cm^{-1}$ likely indicates the presence of a C—N bond in chitosan structure. The absorption peak observed in the 1160-1000 $cm^{-1}$ region relates to C—O—C bond. Amino silane derivatives that include Si and amine groups were used to functionalize the chitosan powder. With reference to FIG. 3, the absorption peak in the 800 $cm^{-1}$ region is indicative of the presence of Si—O—$CH_3$ bond in the functionalized chitosan structure and furthermore, an increase in the intensity of the absorption peak in 2900 $cm^{-1}$ is indicative of an increase in the presence of C—H groups in the functionalized chitosan structure.

EXAMPLE 3

In this example, an adhesive composition including urea formaldehyde resin, chitosan, and a hardener such as ammonium chloride is produced. The produced adhesive composition includes 1.5 wt. % of chitosan (based on solid content of adhesive) and 1 wt. % of ammonium chloride (based on solid content of adhesive). Chitosan is added to the adhesive composition in the form of a chitosan solution in acetic acid with a concentration of 1 wt. %. To this end, the chitosan solution is mixed with the urea formaldehyde resin in a stirred vessel with a stirrer speed of 200 rpm for 20 minutes. Then, ammonium chloride is added to the mixture of urea formaldehyde resin and the chitosan solution. The resultant mixture is stirred for 2 minutes to obtain the adhesive composition, which is referred to hereinafter as SAMPLE A.

EXAMPLE 4

In this example, an adhesive composition including urea formaldehyde resin and chitosan is produced. The produced adhesive composition includes 1.5 wt. % of chitosan (based on solid content of adhesive). Chitosan, in the form of a chitosan powder, is added to the adhesive composition. The chitosan powder is mixed with the urea formaldehyde resin in a stirred vessel with a stirrer speed of 200 rpm for 20 minutes to obtain the adhesive composition, which is referred to hereinafter as SAMPLE B.

EXAMPLE 5

In this example, an adhesive composition is produced, and the composition included urea formaldehyde resin and chitosan powder and, as an example hardener, ammonium chloride. The produced adhesive composition includes 1.5 wt. % of chitosan (based on solid content of adhesive) and 1 wt. % of ammonium chloride (based on solid content of adhesive). First, the chitosan powder is mixed with the urea formaldehyde resin in a stirred vessel, with a stirrer speed of 200 rpm for 20 minutes. Then ammonium chloride is added to the mixture of urea formaldehyde resin and the chitosan. The resultant mixture is stirred for 2 minutes to obtain the adhesive composition, which is referred to hereinafter as SAMPLE C.

EXAMPLE 6

In this example, samples including urea formaldehyde resin, chitosan powder and, as a hardener, ammonium chloride are produced. The first sample, which is hereinafter referred to as SAMPLE D, includes 1 wt. % of chitosan (based on solid content of adhesive) and 1 wt. % of ammonium chloride (based on solid content of adhesive). The second sample, which is hereinafter referred to as SAMPLE E, includes 2 wt. % of chitosan and 1 wt. % of ammonium chloride, both based on solid content of the adhesive. The third sample, which is hereinafter referred to as SAMPLE F, includes 3 wt. % of chitosan and 1 wt. % of ammonium chloride, both based on solid content of the adhesive. The fourth sample, which is hereinafter referred to as SAMPLE G, includes 1 wt. % of chitosan nanopowder (based on solid content of adhesive) as was synthesized in Example 1 and 1 wt. % of ammonium chloride (based on solid content of adhesive). The fifth sample, which is hereinafter referred to as SAMPLE H, includes 1 wt. % of functionalized chitosan (based on solid content of adhesive) as was synthesized in Example 2 and 1 wt. % of ammonium chloride (based on solid content of adhesive). A control sample is also produced that includes only the urea formaldehyde resin and 1 wt. % of ammonium chloride based on solid content of the adhesive composition. Table 1 reports specifications of the adhesive samples produced as was described in detail in connection with Examples 3-6.

TABLE 1

Adhesive Compositions

| Adhesive Sample | Chitosan addition method | Chitosan content | Hardener content |
|---|---|---|---|
| SAMPLE A | Chitosan solution | 1.5 wt. % | 1 wt. % |
| SAMPLE B | Chitosan powder | 1.5 wt. % | 0 wt. % |
| SAMPLE C | Chitosan powder | 1.5 wt. % | 1 wt. % |
| SAMPLE D | Chitosan powder | 1 wt. % | 1 wt. % |
| SAMPLE E | Chitosan powder | 2 wt. % | 1 wt. % |
| SAMPLE F | Chitosan powder | 3 wt. % | 1 wt. % |
| SAMPLE G | Chitosan nanopowder | 1 wt. % | 1 wt. % |
| SAMPLE H | Functionalized chitosan powder | 1 wt. % | 1 wt. % |
| Control Sample | None | 0 wt. % | 1 wt. % |

EXAMPLE 7

In this example, different samples of WBPs with an average density of 750 kgm$^{-3}$ and average thickness of 10 mm are produced. To produce a sample of WBP, an adhesive sample, selected from the adhesive samples reported in Table 1, is sprayed over wooden materials such as, for example, particles, fibers, or strands in a blender. The wooden materials are blended with the adhesive sample and then formed into a wooden layer, with average dimensions of 350 mm by 350 mm. The wooden layer is then hot pressed at 190° C., and a WBP sample is produced. The adhesive sample comprises 10 wt. % of the solid content of the WBP sample. Different WBP samples were produced using different adhesive samples selected from the the adhesive samples reported in Table 1 using the above described method. WBP samples may include engineered layered panels like plywood, glued laminated timber (GLT), cross laminated timber (CLT), etc.

EXAMPLE 8

In this example, the effect of chitosan addition method on the amount of formaldehyde emission from the WBP samples produced as was described in Example 7 was investigated. To this end, four WBP samples prepared by using SAMPLE A, SAMPLE B, SAMPLE C, and control sample adhesives were tested for the amount of formaldehyde emission. The amount of formaldehyde emission from the four WBP samples was measured by the flask method, in accordance with European standard reference number EN 717-3: 1996.

Figure 4:
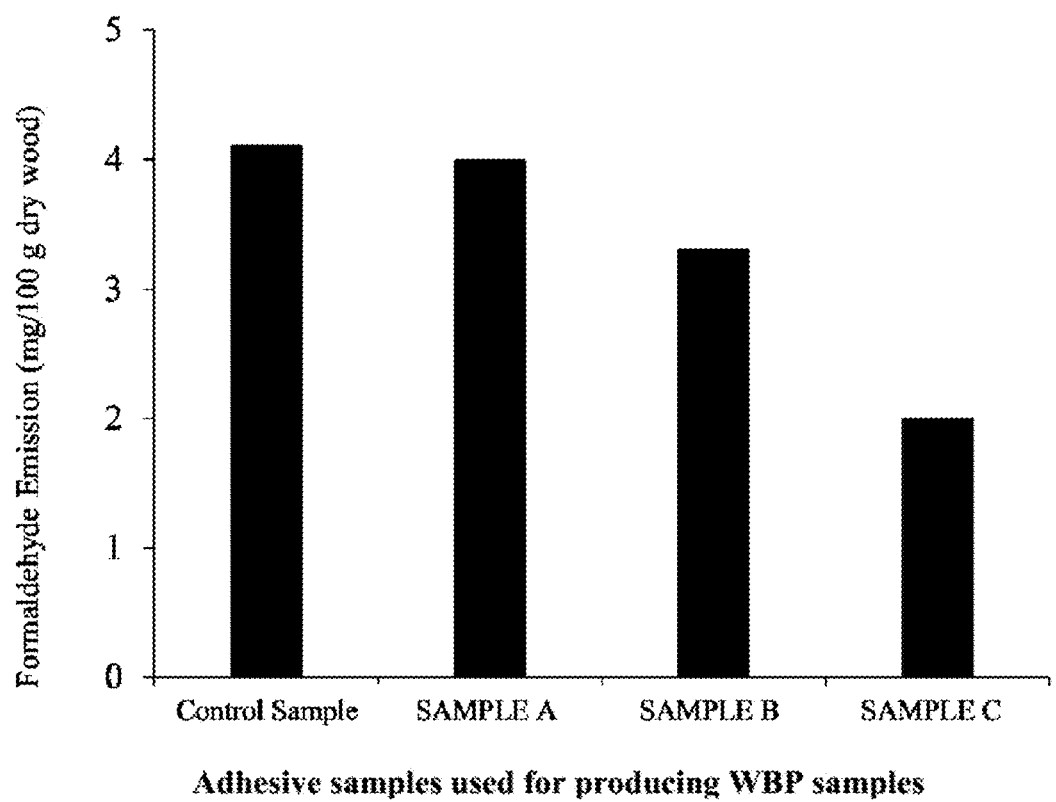
FIG. 4 is a bar chart of formaldehyde emission amount for WBP samples tested by the flask method, according to one implementation of the present disclosure.

FIG. 4 is a bar chart of formaldehyde emission amount for WBP samples tested by the flask method. Referring to FIG. 4, the amount of formaldehyde emission from the WBP sample made by control sample as the adhesive is about 4.1 mg formaldehyde/100 g dry wood. The amount of formaldehyde emission from the WBP sample made by SAMPLE A as the adhesive is about 3.76 mg formaldehyde/100 g dry wood. The amount of formaldehyde emission from the WBP sample made by SAMPLE B as the adhesive is about 3.3 mg formaldehyde/100 g dry wood. The amount of formaldehyde emission from the WBP sample made by SAMPLE C as the adhesive is about 2.0 mg formaldehyde/100 g dry wood. As illustrated by the FIG. 4 bar chart, the amount of formaldehyde emission is considerably reduced by using SAMPLE C which is prepared by adding chitosan as powder along with a hardener to the adhesive composition. Comparing the results obtained for WBP samples made by SAMPLE B and SAMPLE C as the adhesive, shows that the amount of formaldehyde emission is lower for SAMPLE C. This may indicate that the effect of chitosan as a formaldehyde scavenger may be improved in the presence of a hardener.

EXAMPLE 9

In this example, the effect of chitosan amount in the adhesive composition is investigated on the amount of formaldehyde emission from the WBP samples produced as was described in Example 7. To this end, four WBP samples prepared by using SAMPLE D, SAMPLE E, SAMPLE F, and control sample adhesives were tested for the amount of formaldehyde emission. The amount of formaldehyde emission from the four WBP samples were measured by the desicator method in accordance with ISO 12460-4 standard.

Figure 5:
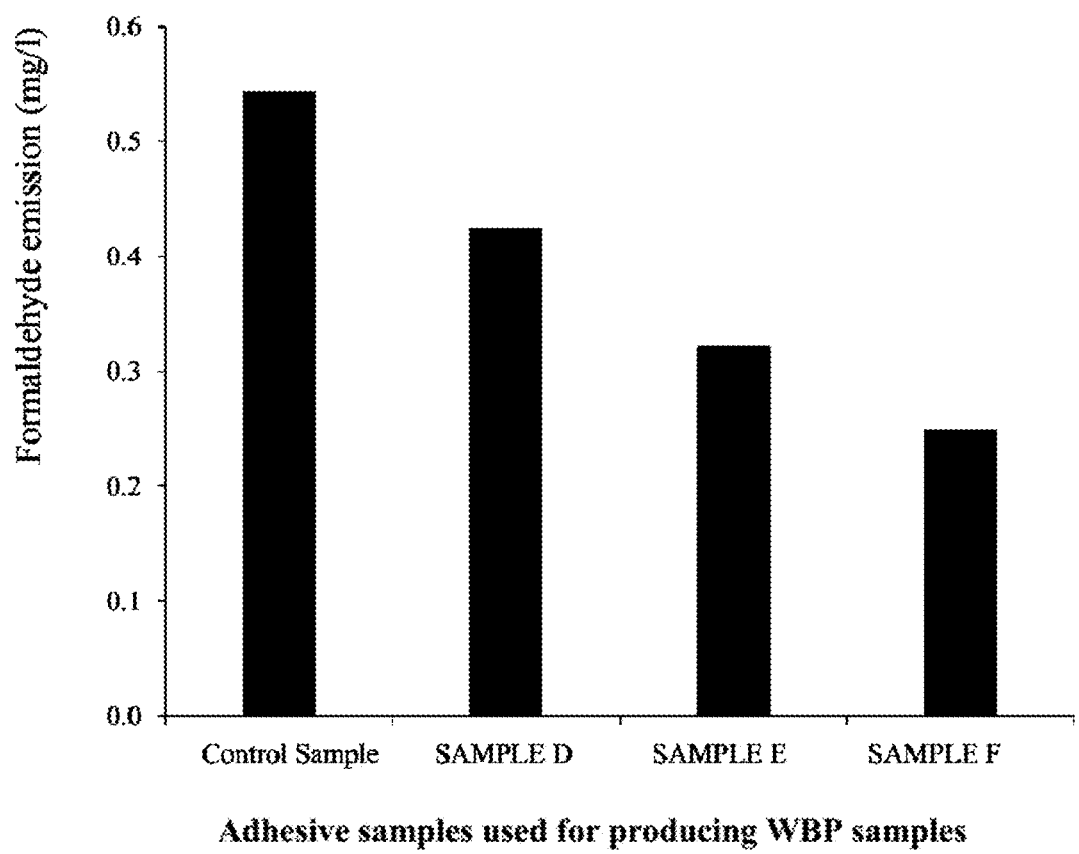
FIG. 5 is a bar chart of formaldehyde emission amount for WBP samples tested by the desicator method, according to one implementation of the present disclosure.

FIG. 5 is a bar chart of formaldehyde emission amount for WBP samples tested by the desicator method. Referring to FIG. 5, the amount of formaldehyde emission from the WBP sample made by control sample as the adhesive is about 0.54 mg formaldehyde/L. The amount of formaldehyde emission from the WBP sample made by SAMPLED as the adhesive is about 0.42 mg formaldehyde/L. The amount of formaldehyde emission from the WBP sample made by SAMPLE E as the adhesive is about 0.32 mg formaldehyde/L, and the amount of formaldehyde emission from the WBP sample made by SAMPLE F as the adhesive is about 0.25 mg formaldehyde/L. As illustrated by FIG. 5, results show that by increasing the amount of chitosan powder in the adhesive composition, the amount of formaldehyde emission from the WBP samples is meaningfully reduced. A comparison between the amount of formaldehyde emission from the WBP sample made by control sample as the adhesive and the amount of formaldehyde emission from the WBP sample made by SAMPLE F as the adhesive shows that the presence of 3 wt. % of chitosan (based on the solid content of the adhesive composition) in the adhesive composition reduces the formaldehyde emission by at least 55%. It was noted that the minimum allowable amount for formaldehyde emission according to JIS A 5908 & 5905 standards is less than 0.3 mg/L. The is likely indicative than, by addition of a relatively small amount (3 wt. %) of chitosan to the adhesive composition, the most stringent standard for allowable formaldehyde emission level may be met.

EXAMPLE 10

In this example, the effects of chitosan nanopowder and functionalized chitosan powder are investigated on the amount of formaldehyde emission from the WBP samples. To this end, four WBP samples prepared by using SAMPLE D, SAMPLE G, SAMPLE H, and control sample adhesives were tested for the amount of formaldehyde emission. The amount of formaldehyde emission from the four WBP samples were measured by the desicator method in accordance with ISO 12460-4 standard.

Figure 6:
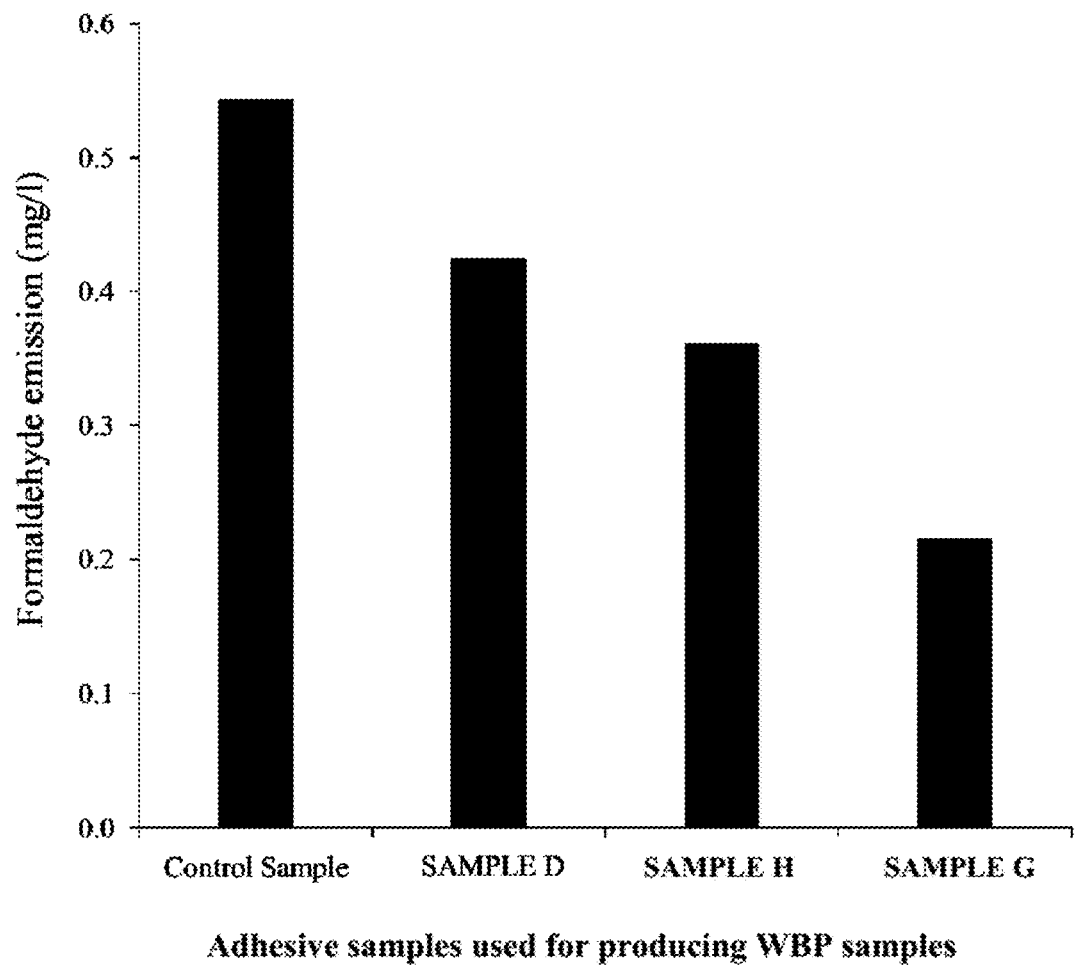
FIG. 6 is a bar chart of formaldehyde emission amount for WBP samples tested by the desicator method, according to one implementation of the present disclosure.

FIG. 6 is a bar chart of formaldehyde emission amount for WBP samples tested by the desicator method. Referring to FIG. 6, the amount of formaldehyde emission from the WBP sample made by control sample as the adhesive is about 0.54 mg formaldehyde/L; the amount of formaldehyde emission from the WBP sample made by SAMPLED as the adhesive is about 0.42 mg formaldehyde/L; the amount of formaldehyde emission from the WBP sample made by SAMPLE H as the adhesive is about 0.36 mg formaldehyde/L; and the amount of formaldehyde emission from the WBP sample made by SAMPLE G as the adhesive is about 0.21 mg formaldehyde/L. The results show that using functionalized chitosan powder may reduce the amount of formaldehyde emission by 34% in comparison with the control sample and 24% in comparison with SAMPLE D in which 1 wt. % of chitosan powder is used. This shows that improving and increasing the functional groups on chitosan may increase the formaldehyde scavenging properties of chitosan. Furthermore, the FIG. 6 bar chart shows that using chitosan nanopowder in relatively small amounts (1 wt. %) may considerably reduce the amount of formaldehyde emission.

EXAMPLE 11

In this example, the effect of chitosan and nano-chitosan addition to the adhesive composition on mechanical properties of WBP samples is investigated. To this end, four WBP samples, prepared by using SAMPLE D, SAMPLE E, SAMPLE F, SAMPLE G and control sample adhesives were subjected to physical and mechanical tests in order to measure mechanical properties, such as modulus of elasticity and bending strength (according to EN310 standard code), internal bonding (according to EN319 standard code), and thickness swelling and water absorption (according to EN317 standard code).

Figure 7:
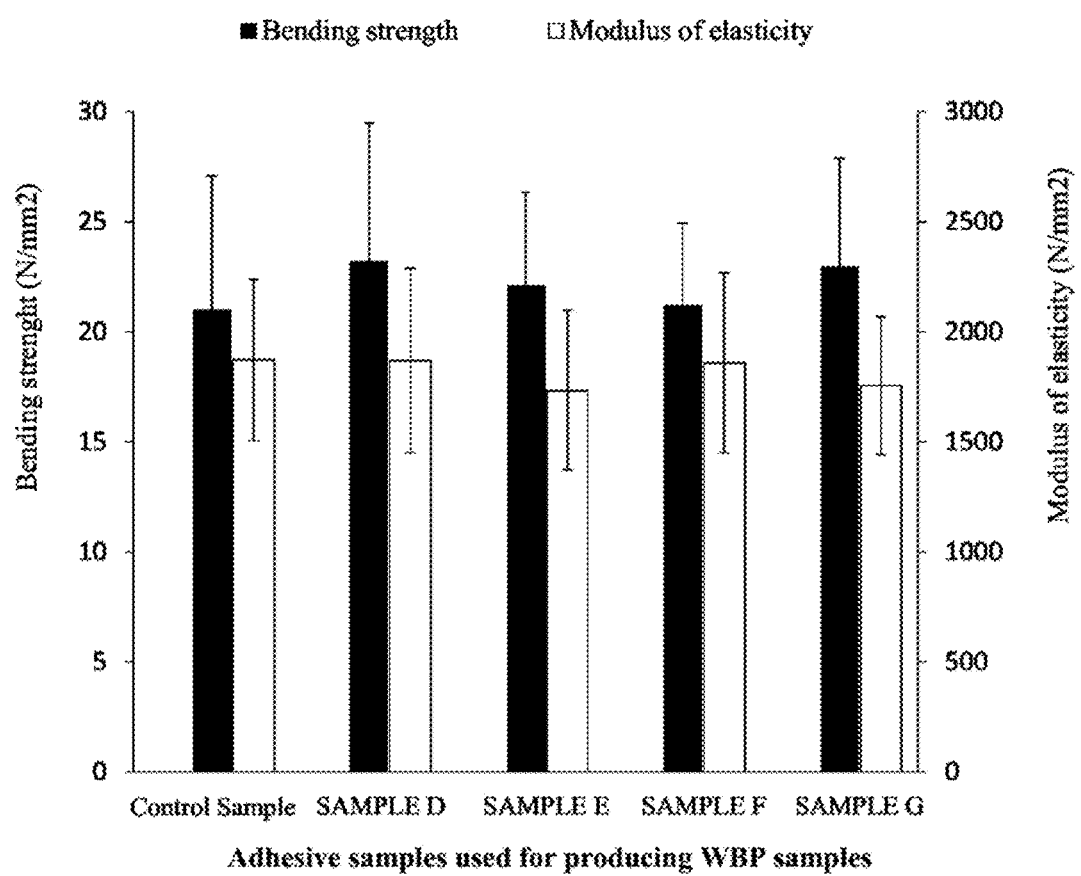
FIG. 7 is a bar chart showing modulus of elasticity and bending strength measured for the WBP samples, according to one or more implementations of the present disclosure.

FIG. 7 is a bar chart showing modulus of elasticity and bending strength measured for the WBP samples containing chitosan powder with different amounts, nano-chitosan, and control sample. Referring to FIG. 7, a slight change in modulus of elasticity and bending strength may be observed for different WBP samples. For example, for a WBP sample containing SAMPLE D adhesive that contains 1 wt. % of chitosan, in comparison with the control sample that contains no chitosan, the bending strength has raised from 21 MPa to 23.2 MPa. As the concentration of chitosan increase from 1 wt. % to 3 wt. % in SAMPLE F, the bending strength decreases to 21.2 MPa, which is comparable with the control group that does not contain chitosan. The modulus of elasticity is about 1800 MPa for all samples.

Figure 8:
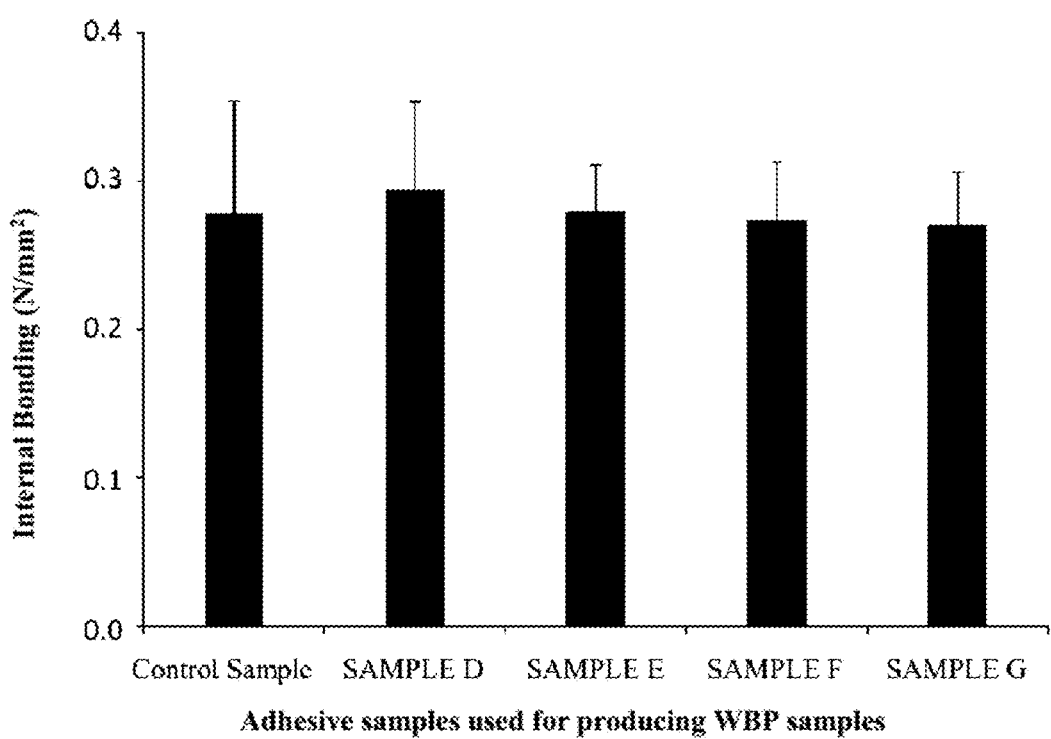
FIG. 8 is a bar chart showing internal bonding of the WBP samples, according to one or more implementations of the present disclosure.

FIG. 8 is a bar chart showing internal bonding for the WBP samples containing chitosan with different amounts, nano-chitosan, and control sample. Referring to FIG. 8 a slight and insignificant change in internal bonding may be observed for different WBP samples.

Figure 9:
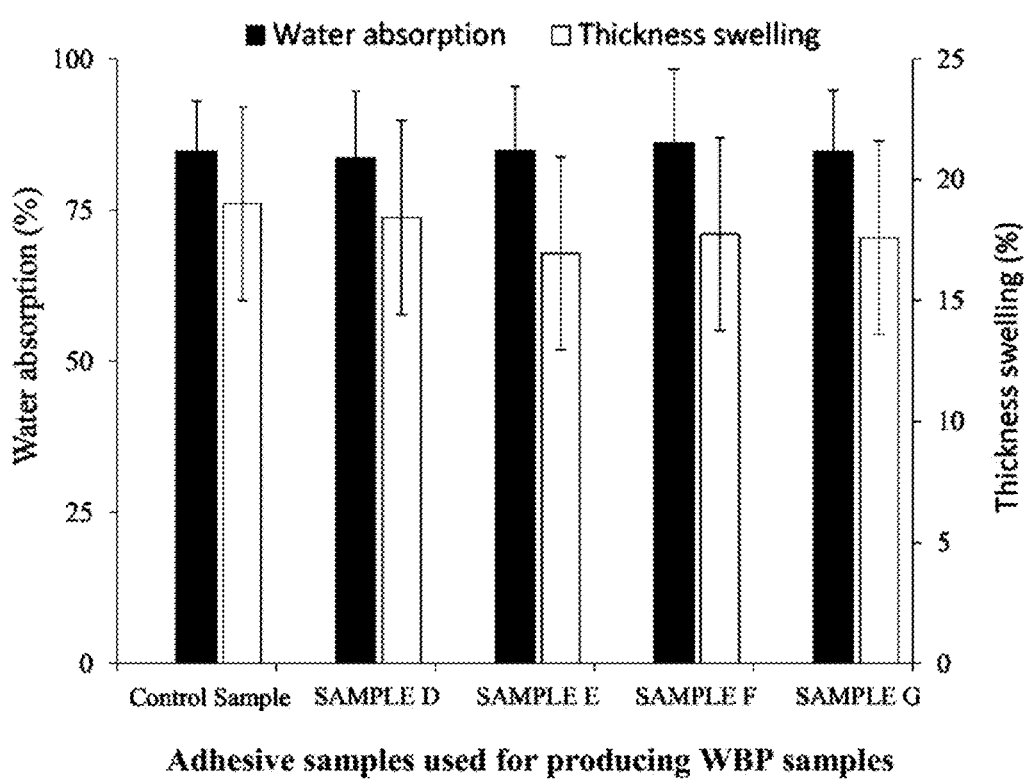
FIG. 9 is a bar chart showing thickness swelling and water absorption for the WBP samples containing chitosan, according to one or more implementations of the present disclosure.

FIG. 9 is a bar chart showing thickness swelling and water absorption for the WBP samples containing chitosan with different amounts, nano-chitosan, and control sample. Referring to FIG. 9, a slight and insignificant change in thickness swelling and water absorption may be observed for different WBP samples after 2 hours and after 24 hours water immersion.

Based on the above-mentioned results, no significant change was observed in modulus of elasticity, bending strength, internal bonding, thickness swelling, and water absorption of WBP samples in the presence of different amounts of chitosan and nano-chitosan. This can indicate that the addition of chitosan and nano-chitosan to the adhesive composition have no significant effect on the physical and mechanical properties of WBP samples produced using the adhesive compositions containing the chitosan or nano-chitosan. Moreover, the amount of formaldehyde emissions is significantly reduced in the presence of chitosan and nano-chitosan.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. An adhesive composition, comprising:
   an aldehyde-based resin selected from the group consisting of urea-formaldehyde resins, melamine-formaldehyde resins, melamine-urea-formaldehyde resins, phenol-containing resins, and combinations thereof; and
   a formaldehyde scavenger comprising nano-chitosan with an average particle size of 10 nm to 110 nm and an amount between 0.01 wt. % and 5.0 wt. % based on solid content of the adhesive composition.

2. The adhesive composition according to claim 1, further comprising:
   a hardener selected from the group consisting of ammonium salts, carbonate-based components, and combinations thereof.

3. The adhesive composition according to claim 2, wherein the hardener has an amount between 0.01 wt. % and 10.0 wt. % based on solid content of the adhesive composition.

4. The adhesive composition according to claim 2, wherein the adhesive composition has a pH between 4 and 13.

5. An adhesive composition, comprising:
   an aldehyde-based resin selected from the group consisting of urea-formaldehyde resins, melamine-formaldehyde resins, melamine-urea-formaldehyde resins, phenol-containing resins, and combinations thereof; and
   a formaldehyde scavenger comprising functionalized chitosan with an amount between 0.01 wt. % and 5.0 wt. % based on solid content of the total adhesive composition, the functionalized chitosan functionalized by formaldehyde absorbent groups.

6. The adhesive composition according to claim 5, wherein the formaldehyde absorbent groups include amino silane derivatives.

7. The adhesive composition according to claim 5, wherein the formaldehyde absorbent groups are selected from the group consisting of manganese oxide, melamine and phenol-based components, graphite/carbon-based components, and any mixture, combination, and sub-combination thereof.

8. The adhesive composition according to claim 5, wherein the formaldehyde absorbent groups are alcohol functional groups, amide functional groups, or amine functional groups, or any mixture, combination, or sub-combination thereof.

9. A method for reducing formaldehyde emissions from wood-based panels (WBPs), the method comprising:
   forming an adhesive composition, by operations including mixing an aldehyde-based resin and a formaldehyde scavenger selected from the group consisting of chitosan, nano-chitosan, functionalized chitosan, and combinations thereof, the formaldehyde scavenger is in a form of a chitosan-based powder selected from the group consisting of chitosan powder, chitosan nanopowder, functionalized chitosan powder, and combinations thereof;
   forming a wooden layer by operations including blending the adhesive composition with wooden materials; and
   hot pressing the wooden layer at a press temperature between 75° C. and 230° C. and at a specific pressure between 0.2 N/mm$^2$ and 8 N/mm$^2$ to obtain WBPs.

10. The method according to claim 9, wherein blending the adhesive composition with wooden materials includes blending the adhesive composition with wooden materials in an amount between 50 g and 400 g per 1 m$^2$ of the wooden materials.

11. The method according to claim 9, wherein blending the adhesive composition with wooden materials includes blending the adhesive composition with wooden materials in an amount between 3 wt. % and 49 wt. % based on solid content of the wooden materials.

12. The method according to claim 9, wherein the formaldehyde scavenger includes functionalized chitosan with an amount between 0.01 wt. % and 5.0 wt. % based on solid content of the total adhesive composition, the functionalized chitosan functionalized by formaldehyde absorbent groups.

13. The method according to claim 12, wherein the formaldehyde absorbent groups include amino silane derivatives.

14. The method according to claim 9, wherein:
   the formaldehyde scavenger includes functionalized chitosan with an amount between 0.01 wt. % and 5.0 wt. % based on solid content of the total adhesive composition, and
   the functionalized chitosan are functionalized by alcohol functional groups, amide functional groups, amine functional groups, or any mixture, combination, or sub-combination thereof.

* * * * *